United States Patent [19]

Dienes

[11] 4,332,975
[45] Jun. 1, 1982

[54] SEALED CABLE ENCLOSURE AND CABLE ASSEMBLY INCLUDING SAME

[75] Inventor: Zoltan B. Dienes, Annandale, N.J.

[73] Assignee: Thomas & Betts Corporation, Raritan, N.J.

[21] Appl. No.: 159,067

[22] Filed: Jun. 13, 1980

[51] Int. Cl.$^3$ ............................................. H02G 15/04
[52] U.S. Cl. ................................... 174/76; 174/77 R; 174/93
[58] Field of Search ...................... 174/93, 74 R, 74 A, 174/76, 77 R

[56] References Cited

U.S. PATENT DOCUMENTS

| | | | |
|---|---|---|---|
| 2,590,160 | 3/1952 | Dixon | 174/77 R X |
| 2,621,228 | 12/1952 | Tompers | 174/93 |
| 3,642,308 | 2/1972 | Zeile, Jr. et al. | 285/47 |
| 3,692,926 | 9/1972 | Smith | 174/92 |
| 3,705,950 | 12/1972 | Jirka et al. | 174/138 |
| 3,903,595 | 9/1975 | Takada et al. | 29/628 |
| 3,935,373 | 1/1976 | Smith et al. | 174/77 |
| 3,955,043 | 5/1976 | Palmer et al. | 174/84 |
| 3,992,569 | 11/1976 | Hankins et al. | 174/92 |
| 4,002,818 | 1/1977 | Kunze | 174/93 X |
| 4,061,872 | 12/1977 | De Monsy et al. | 174/138 |
| 4,083,902 | 4/1978 | Clyde | 264/26 |

Primary Examiner—Roy N. Envall, Jr.
Attorney, Agent, or Firm—Robert M. Rodrick; Salvatore J. Abbruzzese; Jesse Woldman

[57] ABSTRACT

An enclosure for encapsulating and sealing a cable includes a rigid, hollow cylindrical sleeve having an inner wall surface defining a chamber for receiving a portion of the cable therein. One end of the sleeve is sealably enclosed by an end seal and at the other sleeve end an end cap encloses the chamber. An inner disc is spaced longitudinally interiorly of the end cap to define with the end cap and with the inner wall surface, a cavity. An aperture is provided through the sleeve portion in registry with the cavity. Both the inner disc and end cap have apertures therethrough for passage of the cable. A sealing ring of mastic is sealably affixed around the inner wall surface of the sleeve and a sealing band of mastic is sealably affixed around the cable, the sealing ring and sealing band both contacting the inner disc at its longitudinally interior surface. The cavity is filled with expandable foamed polyurethane resin to urge the inner disc into pressing contact with the sealing ring and with the sealing band to thereby effect a seal therebetween.

29 Claims, 3 Drawing Figures

4,332,975

SEALED CABLE ENCLOSURE AND CABLE ASSEMBLY INCLUDING SAME

BACKGROUND OF THE INVENTION

This invention relates to an enclosure for electrical cables and more particularly to an apparatus for encapsulating and sealing a cable splice.

A wide variety of cable enclosures are in use to protect electrical cables that are spliced or prepared to be spliced against hostile environments. For example, in telephone communication systems, it is frequently necessary to splice into one or more of the cables for maintenance, repair or replacement purposes. Often, the cables to be spliced into the system are prepared with terminal connectors for easy connection with mating connectors in the system. Such prepared terminations are also enclosed to protect against the environment during storage and shipment until spliced into the system. Whether for permanent or temporary purposes, it is desirable that the enclosures be properly sealed to protect exposed cable conductors against deterioration caused by moisture, gases or other contaminants, as well as to prevent electrical short circuiting.

It is common practice in this art to form a seal using a foamed plastic such as a polyurethane resin. Such polyurethane resins are readily available and relatively easy to handle. Polyethylene resins have become widely used as a insulating material in electrical cables and also in enclosure casings due to their favorable insulator properties. However, since polyethylene resins are chemically stable, they adhere poorly to the polyurethane resins, in particular under high pressure. Moreover, since the influence of the mutually different thermal expansion coefficients of polyethylene resins and polyurethane resins is enlarged by changes in the environment temperature, the integrity of the adhesion therebetween is further diminished, resulting undesirably in intermittent or completely open seals.

While other components, materials and enclosures may be utilized to provide proper sealing, the use, for example, of petroleum jelly compounds or grease is particularly disadvantageous where ready access to the spliced cable or cable termination is sought and simple, inexpensive installation is desired.

SUMMARY OF THE INVENTION

It is an object of the present invention to provide an improved enclosure for sealing electrical cable.

It is another object of the present invention to provide an apparatus for encapsulating and sealing a splice between two or more electrical cables.

In accordance with the invention, there is provided a rigid, hollow, elongate housing having inner wall surfaces defining a chamber for enclosing and an opening for receiving an electrical cable therein. The housing has a seal enclosing one end and, at the other end an outer wall extending transversely across and covering the opening. An inner wall is spaced longitudinally interiorly of the outer wall, extending transversely across the housing opening within the inner wall surfaces. The inner and outer walls each have an aperture for passage therethrough of the cable, a portion of the cable extending interiorly of said inner wall into the chamber. The inner and outer walls together with the housing inner wall surfaces, define a cavity. The housing portion in registry with the cavity has a filling aperture therethrough, opening into the cavity. An expanded foamed resinous material substantially fills the cavity. Also included in a preferred embodiment of a pressurized enclosure is means responsive to the foamed resinous material for providing a seal between the cavity and the chamber.

The present invention is useful in providing a permanent seal for a splice of two or more cables as well as in providing a temporary seal in enclosures encapsulating cable terminals prepared with connection elements to be eventually connected to existing cables.

In the particular use as a cable splice protector, the housing may be adapted to cooperate with a pair of plate members at each housing end serving as the inner and outer walls with a foamed resinous material therebetween at each and so that cables may be brought sealably into the chamber from both ends of the housing.

DETAILED DESCRIPTION OF THE PREFERRED EMBODIMENTS

Figure 1:
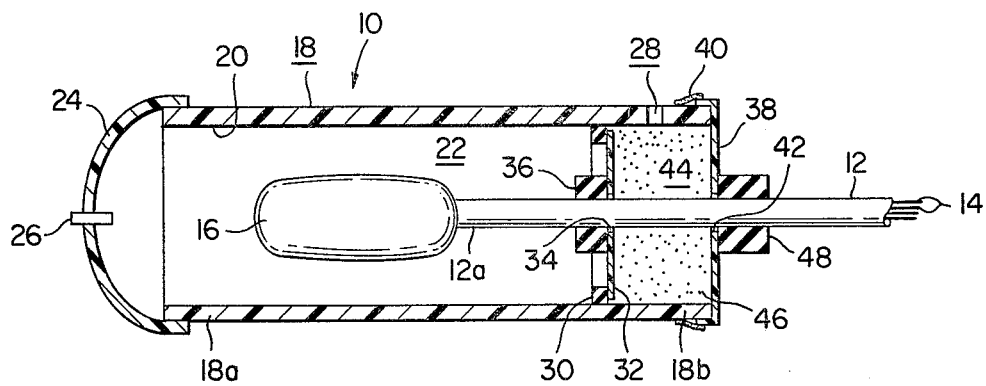
FIG. 1 is a longitudinal cross-section of an apparatus encapsulating and sealing a cable in accordance with the invention.

Referring to the drawing, there is shown in FIG. 1 an enclosure 10 for sealing and encapsulating an electrical cable 12, the seal preferably being a high pressure seal. The cable 12 is typically of conventional construction comprising an outer insulation of polyethylene or other plastic material and a plurality of conductors 14 insulatively contained therewithin. In the arrangement illustrated, one end 12a of the cable 12 is prepared to terminate in connecting elements (not shown) which are intended to be connected to mating connectors in a system of cables that may be buried underground, in overhead systems or in buildings. The connecting elements may be covered by an insulating tape or the like, the prepared cable termination being indicated generally as numeral 16 in FIG. 1. The connecting elements are connected to, and thereby expose, the conductors 14 in the cable 12. Since the cables are commonly prepared in an assembly area and shipped to the intended field installation area, it is necessary to provide an enclosure to effectively seal the connecting elements and the exposed conductors 14 from hostile environments until the cables 12 are installed.

The enclosure 10 includes a hollow, elongate sleeve 18, preferably of cylindrical configuration, having an inner wall surface 20 that defines a chamber 22 therein. Other sleeve configurations of non-circular cross-section may also be used. The sleeve 18, made of rigid material, preferably plastic, such as, for example, polyvinylchloride or polyethylene, serves as a housing for containing the prepared cable termination 16. An end cover 24, of plastic or other suitable material, is sealed as by an epoxy, glue or other suitable sealant to one end 18a of the sleeve 18. Although a separate end cover 24 is used for ease of manufacture, it should be understood that end cover 24 may be an end wall that is formed integrally with the walls of the housing 18. A pressure valve 26, may be provided sealably through the cover 24 to enable pressurization of the chamber 22, as will be described.

Adjacent the other sleeve end 18b, a hole 28 extends through the wall of the sleeve. Adjacent the hole 28 at a location longitudinally more interior than the hole 28, a ring 30 of sealant material such as mastic (commonly uncured butyl rubber) is affixed to the inner wall surface 20 completely therearound. The mastic ring 30 affixed thereto provides a seal between the ring 30 itself and the portion of the inner wall surface 20 to which it is attached.

A thin, inner disk-like plate 32, is formed to have a circumference that fits closely to and within the inner wall surface 20 of the sleeve 18. The plate 32 has a central aperture 34 for passage of the cable 12 therethrough. The plate 32 is positioned on the cable 12 to contact, at its peripheral surface portion, the mastic ring 30. In its preferred form, the plate 32 is made of soft, low density polyethylene, on the order of 0.030 inch thick, for ease of removal, as will be described.

A band 36 of sealant material, such as mastic, is sealably affixed around the cable 12 such that a seal is provided between the cable 12 and the band 36. The band 36 is positioned on the cable to contact the inner plate 32 on the same side as the mastic ring 30. To assure contact therebetween, the outer diameter of the band 36 is formed larger than the diameter of the aperture 34.

A thin, disk-like end cap 38 extends across the sleeve end 18b and is secured preferably to the sleeve by an adhesive tape 40 or other adherent that is readily removable. An aperture 42 is provided through the end cap 38 for passage of the cable 12 therethrough. The end cap 38 is positioned on the cable 12 to enclose the sleeve end 18b. It is also preferred that the end cap 38 be made of low density polyethylene on the order of 0.030 inch thick, although other suitable materials and thicknesses may be used.

Figure 2:
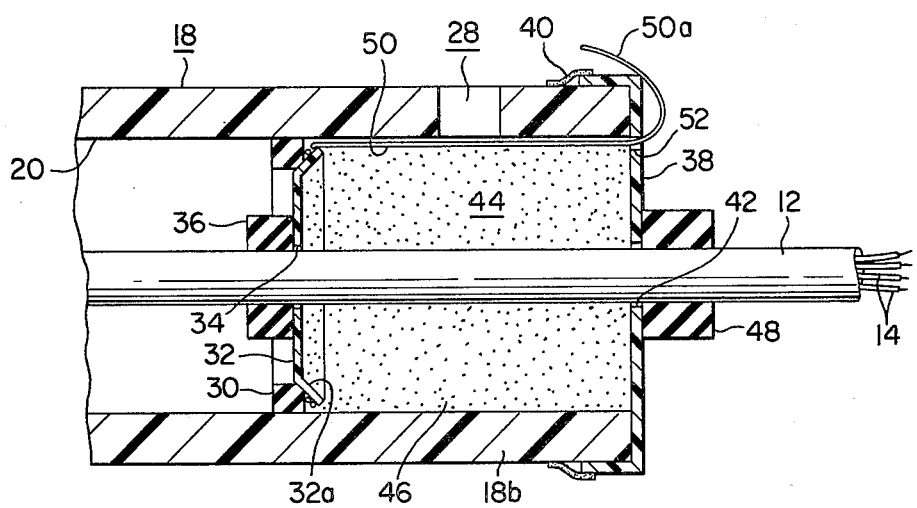
FIG. 2 is an enlarged view of a portion of FIG. 1 showing details of the invention in a preferred configuration.

The end cap 38 and the inner wall 32, together with the inner wall surface 20 of the sleeve 18 define a cavity 44 in registry with the aperture 28. The cavity 44 is filled substantially with an expandable foamed resinous material 46 such as polyurethane resin or other foamed plastics. In the particular application of the enclosure being described, it is preferable that the density of the foamed polyurethane resin be relatively low to facilitate openability of the temporarily sealed enclosure 10 encapsulating the cable termination 16. Upon filling the cavity 44 with the desired foamed material 46, the secured end cap 38 serves as a barrier wall, and the expanding foamed material urges the inner plate 32 into pressing contact with the sealing ring 30 and with the sealing band 36. The resilient mastic materials of the ring 30 and the band 36 deform to provide an effective seal at the compressed interfaces. The peripheral portion 32a of the inner plate 32 may be beveled as shown in FIG. 2 so that under the force of the expanding foamed material, the inclined beveled portion 32a wedges into the mastic ring 30, thereby enhancing the seal at the compressed interface. The seals thus provided at the sleeve 18a and 18b effectively seal the cable portion 12a and the termination 16 within the chamber 22. The chamber 22 may be pressurized for further environmental protection by introducing therein through the pressure valve 26 a compressed, chemically inert gas, such as nitrogen, at a desired pressure.

To prevent the escape of the foamed material 46 through the aperture 42 in the end cap 38, a ring 48 of mastic or other material, such as adhesive tape, may be placed on the cable 12 and on the exterior surface of the end cap 38 so as to enclose the aperture 42. A sufficient axial length of mastic 48 or tape preferably formed to taper radially inwardly from the periphery of the end cap 38 toward the cable 12 will provide a strain relief to the cable 12.

To assemble the sealed assembly, the end cover 24 is secured to the sleeve 18, the hole 28 being formed through the sleeve 18. The mastic ring 30 is affixed around the inner surface 20 of the sleeve 18 at the location interiorly adjacent the hole 28. Either prior to the preparation of the termination 16 or thereafter if the termination covering is smaller than the cable diameter, the end cap 38 is first slid onto the cable 12 and then the inner plate 32 is slid thereon. At a measured distance from the termination 16, the mastic band 36 is securely affixed around the cable portion 12a. The inner plate 32 is brought into contact with the mastic band 36 and pressed firmly thereagainst so that the plate 32 adheres thereto. The housing 18 is then placed over the prepared termination 16 until the inner plate 32 engages the mastic ring 30. The plate 32 may be manually pressed against the mastic ring 30 to establish good contact therebetween. The end cap 38 is then brought into engagement with the sleeve end 18b and secured thereto by a quantity of tape 40. The ring of mastic 48 is then placed on the cable 12 and against the end cap 38 to cover the aperture 42. Expandable foamed polyurethane resin 46 is then introduced with use of suitable equipment into the cavity 44 through the filling hole 28 until the cavity 44 is substantially filled. Upon curing of the resin 46, the sealed assembly is established.

The enclosure 10 may be provided with various modifications to facilitate removal, particularly of the body 46 of foamed material. For example, as depicted in FIG. 2, a length of strong, thin flexible wire 50, preferably non-metallic, may be secured to the inner plate 32 at its periphery and wrapped therearound at least once, but preferably several times. The wire 50 extends from the inner plate 32 axially along the inner wall surface 20, the free end 50a emerging from the exterior of the housing end 18b. An aperture 52 may be formed through the end cap 38 for passage of the wire 50 or the wire end 50a may be wrapped around the walls of the sleeve end 18b and emerge from beneath the tape 40. Upon removal of the end cap 38, the wire end 50a is pulled and moved along the inner wall surface 20, cutting through the solid foamed polyurethane resin 46. The body 46 of resin is thus separated from the inner wall surface 20 and can be easily removed for access to the inner plate 32. Upon removal of the resin 46, the termination 16 and cable 12 may be readily withdrawn from the sleeve 18. The soft inner plate 32 may be removed from the cable as by cutting with suitable tools.

Figure 3:
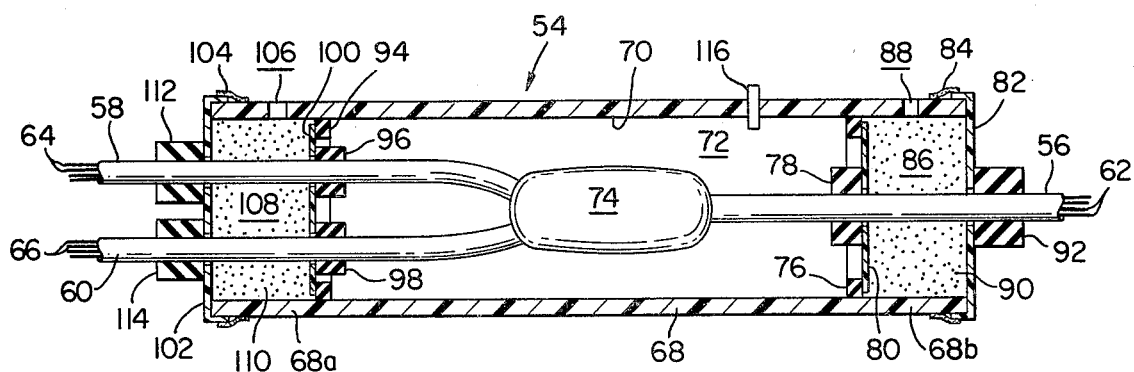
FIG. 3 is a longitudinal cross-section of an apparatus of the present invention arranged to encapsulate and seal a splice of a plurality of cables.

Although the invention has been described herein in the embodiment of an enclosure for temporary sealing cables prepared with terminations to be connected into existing systems, it should be appreciated that the invention is not so limited. In another embodiment of the invention as shown in FIG. 3, an apparatus 54 is used to seal and encapsulate a plurality of electrical cables 56, 58 and 60, each being similar to electrical cable 12 and having conductors 62, 64 and 66, respectively, therein. A plastic, hollow cylindrical sleeve 68, similar to sleeve 18 has an inner surface 70 defining a chamber 72 surrounding the cable splice, generally indicated as numeral 74. As illustrated, one of the cables 56 is brought sealably into the chamber 72 through the sleeve end 68b while the other two cables 58 and 60 are brought sealably into the chamber 72 through the sleeve end 68a. Selected conductors 62, 64 and 66 of the respective cables are spliced together, the splice 74 being covered typically by a suitable covering. It should be understood that the number of cables shown is for illustrative purposes, and that at least two cables may be spliced, the apparatus 54 arranged such that each cable may enter the chamber 72 from one end of the sleeve 68 or at least on cable may enter the chamber 72 from each end of the sleeve 68.

As shown, each sleeve end 68a and 68b is arranged to have a seal thereat similar in construction to the seal provided at sleeve end 18b of FIG. 1 and assembled in similar manner as described hereinabove. At sleeve end 68b, there is a ring 76 of mastic sealably affixed around the inner wall surface 70 and a band 78 of mastic sealably affixed around the cable 62. An inner plate 80 contacts the ring 76 and the band 78 and an end cap 82 encloses the sleeve end 68b, the end cap 82 being secured to the sleeve 68 as by tape 84. The inner plate 80 and end cap define with the inner wall surface 70 a cavity 86, a filling hole 88 being formed through the sleeve 68 in registry therewith. The cavity 86 is filled with foamed polyurethane resin 90 or other foamed plastics, preferably of high density, to provide a rigid setting upon curing for a more permanent seal. A layer 92 of mastic may be wrapped around the cable 56 and pressed against the exterior of the end cap 82 to further prevent escape of the foamed material 90.

The other sleeve end 68a is adapted to seal two cables 58 and 60. A ring 94 of mastic is sealably affixed to inner wall surface 70 and sealing bands 96, 98 are sealably affixed, respectively, around the cable 58 and 60. An inner plate 100, having two apertures therethrough for passage of the cables 58 and 60, contacts the ring 94 and bands 96 and 98. An end cap 102, also having two apertures for passage of the cables 58 and 60, encloses the sleeve end 68a, and is secured thereto by tape 104. A filling hole 106 is provided through the sleeve 68, in registry with the cavity 108 defined by the inner plate 100, end cap 102 and the inner wall surface 70. The cavity 108 is also filled with a high density polyurethane resin 110 or other like foamed plastic. Layers of mastic 112 and 114 may be provided, respectively, around the cables 58 and 60 and against the portion of the end cap 102. The splice 74 is thus sealed within the chamber 72 by the apparatus 54 at both sleeve ends 68a and 68b for permanent use in underground systems, overhead installations or the like. The chamber 72 may be pressurized by introducing therein a compressed chemically inert gas through a pressure valve 116 sealably extending through a wall of the sleeve 68.

In assembling the sealed splice shown in FIG. 3, the steps are similar to those set forth herein with reference to the assembly of the cable enclosure of FIG. 1. The housing 68 may be provided with the holes 88 and 106 and the mastic rings 76 and 94 affixed thereto. Before the cables are joined together in the splice 74 and while the ends are free and unconnected, the end cap 82, inner disc 80 and the housing 68 are slid, in order, onto the cable 62 away from the cable splice area. The end cap 102 and inner plate 100 are slid, in order, onto the cables 58 and 60. After the cables 58, 60 and 62 are joined, the mastic bands 96 and 98 are affixed to cables 58 and 60, respectively, a predetermined distance from the splice 74. The mastic band 78 is then affixed to the cable 62 a measured distance from the bands 96 and 98, the measured distance corresponding to the longitudinal distance between the mastic rings 76 and 94 on the housing inner wall surface. Suitable tools may be used to assure proper spacing of the bands 78, 96 and 98. The inner plate 100 is then brought into contact with bands 96 and 98 and the housing 68 is slid over the splice 74 until the ring 94 contacts the inner plate 100. The end cap 102 is then secured to end 68a. The inner plate 80 is then slid into the housing end 68b to contact both the ring 76 and the band 78. The end cap 82 is then secured to sleeve end 68b. The bodies 90 and 110 of foam are introduced into the cavities 86 and 108 to establish the desired seals.

Although the invention has been described herein in the preferred embodiment as an enclosure having a seal for withstanding high internal pressures, it should be appreciated that under less demanding conditions such a seal would not be required. Without the need for such a high pressure seal, the seal provided by the polyurethane resin 46 (FIG. 1) between the inner wall surface 20 and around the cable 12 would be sufficient, for example, in watertight applications or in other applications where the pressure is relatively low. Under these conditions, the mastic ring 30 and mastic band 36 may be eliminated. Of course, the ring 30 and band 36 may be used even in low pressure applications for additional sealing protection.

Various other changes to the foregoing, specifically disclosed embodiments and practices will be evident to those skilled in the art. For example, although the end cap 38 (FIG. 1) is shown as externally fitting onto the sleeve end 18b for handling convenience, it may be modified to fit internally within the inner wall surface 20 as long as it cooperates to provide the desired cavity and serves as an outer wall to hold the foamed resinous material in the cavity. Accordingly, the foregoing preferred embodiments are intended in an illustrative and not in a limiting sense. The true spirit and scope of the invention are set forth in the following claims.

What is claimed is:

1. A sealed cable assembly, comprising:
an electrical cable; and
a rigid enclosure surrounding a portion of said cable, said enclosure comprising an elongate, hollow housing having inner wall surfaces defining a chamber and an opening for receiving said cable therein; a seal enclosing one end of said housing; at the other housing end an outer wall extending transversely across and covering said opening; an inner wall spaced longitudinally interiorly of said outer wall extending transversely across said opening within said inner wall surfaces; said inner and outer walls each having an aperture for passage of said cable therethrough, a portion of said cable extending interiorly into said chamber; said inner and outer walls defining with said housing inner wall surfaces a cavity; the housing portion in registry with said cavity having a filling aperture therethrough, opening into said cavity; an expanded foamed resinous material substantially filling said cavity; and means inclusive of said inner wall responsive to said foamed resinous material for providing a seal between said cavity and said chamber, whereby said chamber surrounding said cable portion is sealed at both ends thereof.

2. An assembly according to claim 1, wherein said sealing means includes a sealing member sealingly affixed around said inner wall surfaces; a sealing band sealingly affixed around said cable, said sealing member and said sealing band contacting said inner wall at its interior surface and in response to said foamed resinous material, urging said inner wall into pressing contact with said sealing member and with said sealing band to effect a seal therebetween.

3. An assembly according to claim 1, wherein said housing is substantially cylindrical and wherein said inner and outer walls are disk-like plates.

4. An assembly according to claim 3, wherein said outer wall is an end cap secured to said housing.

5. An assembly according to claim 3, wherein said housing is plastic.

6. An assembly according to claim 4, wherein inner wall and said end cap are plastic.

7. An assembly according to claim 2, wherein said sealing member is a ring of mastic material.

8. An assembly according to claim 7, wherein the peripheral portion of said inner wall is beveled, the beveled portion contacting said mastic ring.

9. An assembly according to claim 7, wherein said sealing band is a ring of mastic material.

10. An assembly according to claim 1, further including barrier means for preventing escape of said foamed resinous material through the aperture in said outer wall.

11. An assembly according to claim 10, wherein said barrier means is a ring of mastic material on said cable and against said outer wall.

12. An assembly according to claim 1, further including means for pressurizing said chamber.

13. An assembly according to claim 1, wherein said seal is an end cover sealably secured to said housing.

14. An assembly according to claim 1, wherein said seal is an end wall portion integrally formed with the walls of said housing.

15. An assembly according to claim 1, further including means for separating the foamed resinous material from the inner wall surfaces of said housing to effect removal therefrom.

16. An assembly according to claim 15, wherein said separating means comprises a length of wire, one end of which is secured to the peripheral portion of said inner wall, said wire extending at least once around the periphery thereof and longitudinally along the inner wall surface portion of said housing, the other end of said wire emerging exteriorly from the outer wall.

17. An assembly according to claim 2, wherein said seal comprises:
a second pair of longitudinally spaced inner and outer walls extending transversely across the chamber, said inner and outer walls each having an aperture for passage therethrough of a second cable, a portion of said second cable extending interiorly into said chamber for splicing together with said interiorly extending portion of said first mentioned cable, the second inner wall being within the inner wall surfaces of said housing and said second outer wall covering said chamber, said second inner and outer walls defining with said inner wall surfaces a second cavity; the housing portion in registry with said second cavity having a second filling aperture therethrough opening into said second cavity, a second sealing member sealingly affixed around said inner wall surfaces, a second sealing band sealingly affixed around said second cable, said second sealing member and said second sealing band contacting said second inner wall at its interior surface thereof, and an expandable foamed resinous material substantially filling said second cavity and urging said second inner wall into pressing contact with said second sealing member and with said second sealing band to effect a seal therebetween.

18. An apparatus for encapsulating and sealing a splice of at least two electrical cables, comprising:
a rigid, hollow, elongate housing having inner wall surfaces defining a chamber for surrounding the splice therein, an end seal enclosing each end of said housing, at least one of said cables adapted to sealably extend through at least one of said end seals, said one end seal including:
(a) a pair of longitudinally spaced plate members extending transversely across said chamber, the longitudinally innermost plate member being positioned within said inner wall surfaces, each plate having an aperture for passage of said cable therethrough, said plate members defining with said housing inner wall surfaces a cavity;
(b) a portion of said housing in registry with said cavity having a filling hole therethrough opening into said cavity;
(c) a body of expanded foamed resinous material substantially filling said cavity; and
(d) means inclusive of said innermost plate member responsive to said foamed resinous material for providing a seal between said cavity and said chamber.

19. An apparatus according to claim 18, wherein at least another one of said cables is adapted to extend through said one end seal, each of said plate members having another aperture for passage of said other cable therethrough.

20. An apparatus according to claim 18, wherein at least another one of said cables is adapted to sealably extend through the other end seal, said other end seal including another set of elements (a) through (d).

21. An enclosure kit for encapsulating and sealing an electrical cable, comprising:
a rigid, hollow, elongate sleeve having inner wall surfaces defining a chamber adapted to receive a portion of said cable therein, said sleeve having adjacent a cable receiving end a filling hole through a wall portion thereof;
a first plate member having an aperture therethrough adapted to be positioned on said cable and adapted to fit within said inner wall surfaces of said sleeve;
a second plate member adapted to extend across said inner wall surfaces at a location more longitudinally exterior than said filling hole, said second plate member having an aperture for passage of said cable therethrough, said first and second plate members, defining with said inner wall surfaces a cavity in registry with said filling hole for receiving through said filling hole an expandable foamed resinous material; and
means inclusive of said first plate member adapted to fit within said chamber and further adapted to be responsive to said expandable foamed resinous material for providing a seal between said chamber and said cavity.

22. A kit according to claim 21, wherein said sealing means comprises a sealing member sealingly affixed around the inner wall surfaces of said sleeve at a location adjacent to and more longitudinally interior than said filling hole and adapted to contact said first plate member; and a sealing band adapted to be sealingly affixed around said cable and to contact said first plate member on the same side as said sealing member, said first plate member adapted to be urged into pressing contact with said sealing member and with said sealing band in response to said expandable foamed resinous material to effect a seal therebetween.

23. An enclosure kit according to claim 21, wherein said second plate member is an end cap adapted to be secured to the outside of said sleeve.

24. An enclosure kit according to claim 21, further including valve means adapted to pressurize said chamber surrounding said cable portion.

25. A sealed cable assembly, comprising:
an electrical cable; and
a rigid enclosure surrounding a portion of said cable, said enclosure comprising an elongate, hollow housing having inner wall surfaces defining a chamber and an opening for receiving said cable therein; a seal enclosing one end of said housing; at the other housing end an outer wall extending transversely across and covering said opening; an inner wall spaced longitudinally interiorly of said outer wall extending transversely across said opening within said inner wall surfaces; said inner and outer walls each having an aperture for passage of said cable therethrough, a portion of said cable extending interiorly into said chamber; sealing means disposed within said chamber and adapted to be sealingly engaged by said inner wall; and means disposed between said inner wall and said outer wall for causing sealable engagement of said inner wall with said sealing means.

26. An apparatus for encapsulating and sealing a splice of at least two electrical cables, comprising:
a rigid, hollow, elongate housing having inner wall surfaces defining a chamber for surrounding the splice therein, an end seal enclosing each end of said housing, at least one of said cables adapted to sealably extend through at least one of said end seals, said one end seal including:
(a) a pair of longitudinally spaced plate members extending transversely across said chamber, the longitudinally innermost plate member being positioned within said inner wall surfaces, each plate having an aperture for passage of said cable therethrough;
(b) sealing means disposed within said chamber and adapted to be sealingly engaged by said innermost plate member; and
(c) means disposed between said innermost plate member and the outermost plate member for causing sealable engagement of said innermost plate member with said sealing means.

27. An assembly according to claim 25 further comprising:
a cavity defined by said inner and outer walls within said housing inner wall surface; said housing in registry with said cavity having a filling aperture therethrough, opening into said cavity; and said engagement means comprising an expanded foamed resinous material substantially filling said cavity.

28. An apparatus according to claim 26 wherein said one end seal further comprises:
(d) a cavity defined between said plate members;
(e) a portion of said housing in registry with said cavity having a filling hole therethrough opening into said cavity; and
said engagement means comprising a body of expanded foamed resinous material substantially filling said cavity.

29. An assembly according to claim 25 wherein said sealing means includes a sealing member sealingly affixed around said inner wall surfaces; a sealing band sealingly affixed around said cable; said sealing member and said sealing band contacting said inner wall at its interior surface.

* * * * *